SATURABLE SOLID STATE NONRECTIFYING SWITCHING DEVICE

Filed March 24, 1966 2 Sheets-Sheet 1

INVENTOR.
PAUL E. LIGHTY
BY
Arthur L. Lessler
ATTORNEY

SATURABLE SOLID STATE NONRECTIFYING SWITCHING DEVICE

Filed March 24, 1966 2 Sheets-Sheet 2

INVENTOR.
PAUL E. LIGHTY
BY
Arthur L. Lessler
ATTORNEY

United States Patent Office 3,418,619
Patented Dec. 24, 1968

3,418,619
SATURABLE SOLID STATE NONRECTIFYING SWITCHING DEVICE

Paul E. Lighty, Lafayette, N.J., assignor to International Telephone and Telegraph Corporation, Nutley, N.J., a corporation of Delaware Filed Mar. 24, 1966, Ser. No. 537,187
9 Claims. (Cl. 338—20)

ABSTRACT OF THE DISCLOSURE

This is a solid state switching device that is free of barrier layers and PN junctions and is capable of operating in at least two stable physical states. The device comprises a mass of glass having a resistivity within the range of $10^2$ to $10^8$ ohm-cm., the shape of a filament and electrodes attached to the ends of the filament. The filament has a diameter of the order of $10^{-3}$ to $10^{-2}$ inches and a length of the order of 10 to 100 times the magnitude of the diameter. When the proper control signal is applied to the electrodes, the glass filament will switch from one state to another, and since the filament is shaped so thin that only one conductive channel can exist therein, substantially all of the material in the filament will switch to the selected state.

This invention relates to nonrectifying phase change switches, i.e. switching devices exhibiting at least two physical states and capable of being switched between said states by suitable electrical control signals. More specifically, the invention relates to techniques for fabrication of improved phase change switches having stable switching characteristics.

Semiconductive materials which exhibit two or more stable states having different electrical characteristics are well known in the art. For example, U.S. Patent No. 3,241,009 and the corresponding Canadian Patent No. 699,155 to J. F. Dewald, W. R. Northover and A. D. Pearson discloses a family of such materials, comprising compositions of the ternary group arsenic-tellurium-iodine which exhibit at least two stable conditions, one of said conditions being characterized by a relatively high electrical resistance and the other of said conditions being characterized by a relatively low electrical resistance.

While various theoretical explanations have been advanced for the behavior of such phase change materials, it is now believed that the low resistance state is characterized by an ordered crystalline structure, while the high resistance state is characterized by a structure which is locally ordered but macroscopically amorphous or polycrystalline. When the phase change material is heated above a critical temperature, and is then rapidly cooled it does not have an opportunity to form an ordered crystalline structure and therefore remains in a high resistance state. If the heated material is slowly cooled from the high critical temperature, it resolves itself into an ordered crystalline structure and thereby assumes a relatively low resistance state. It should be emphasized that these materials are macroscopically homogeneous in nature and do not contain barrier layers or PN junctions; therefore such devices are generally suitable for AC as well as DC operation.

Devices which are operated in such a manner as to remain in one of the two aforementioned resistance states only momentarily, i.e., while the switching signal is present, are referred to as being unistable, whereas devices which remain in either resistance state after the control signal which has switched them thereto is removed are referred to as being bistable.

The present invention is applicable to both unistable and bistable devices.

Solid state switching devices employing phase change material such as that disclosed, e.g., in Canadian Patent No. 699,155 are generally in the form of a mass of such material contacted by at least two spaced electrodes. The phase change material is initially in either its "off" (high resistance) or "on" (low resistance) state. When a device comprised of material which is initially in the "off" state is turned "on" by a suitable voltage applied between its electrodes a channel of "on" material extending between the electrodes is formed.

Similarly, after such a device has been turned "on" and subsequently turned "off" a region of "on" material remains within the mass of "off" material, but the "on" material no longer forms a channel between the electrodes.

Due to the fact that the relative proportions of "on" and "off" material tend to vary with the number of cycles of operation of the phase change switching device as well as with the parameters of the electrical control signals applied thereto, it has heretofore not been possible to achieve stable operation with such devices utilizing relatively simple circuitry.

Another disadvantage of phase switching devices heretofore known resides in the fact that the length, diameter and orientation of the conductive channel formed when an "off" device is turned "on" tends to vary from cycle to cycle of operation. The effect of this variation is to cause the device to turn "on" and "off" at different potentials and/or currents in successive cycles, thereby resulting in a cycle to cycle "jitter" effect.

Another disadvantage of phase change switches heretofore known is the fact that the "on" and "off" materials possess different densities; therefore differential expansion during cycling of the material results in the formation of minute crevices or microcracks which deteriorate switching performance.

Accordingly, an object of this invention is to eliminate the jitter and microcracking problems inherent in phase change switches heretofore known.

Another object of the invention is to provide phase change switches which are noncritical with respect to the electrical control switching signals required therefor.

These and other objects which will become apparent upon reference to the following detailed description, the accompanying drawings and the appended claims are achieved by providing a saturable phase change switching device such that all the phase change material therein is switched to one selected resistance state. The invention also provides saturable devices wherein all the phase change material is switched between both resistance states.

Figure 1:
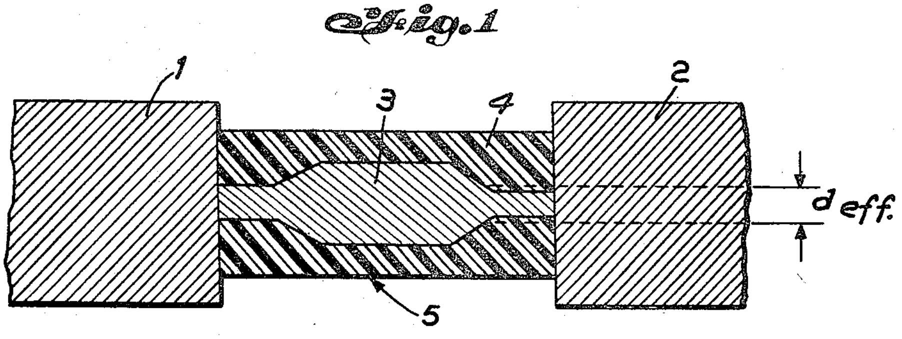
FIGS. 1 and 2 show nonsaturable devices according to the prior art.

The invention will be better understood by reference to the following detailed description:

Referring to FIG. 1 which shows a phase change switching device in accordance with the prior art, a mass 5 of phase change material is sandwiched between electrodes 1 and 2. Initially, the entire mass 5 is in its high resistance or "off" state, in which the resistance between electrodes 1 and 2 may be of the order of one megohm or more. An electrical control signal in the form of an increasing voltage is applied between electrodes 1 and 2.

As the voltage is increased, the phase change material remains in its "off" state until the voltage reaches a threshold value $V_1$, at which time the material 5 breaks down to form a conducting channel 3 between the electrodes. The effective diameter $d_{eff}$ of the conducting channel will depend upon the amount of heat generated in the phase change material 5, which in turn will depend upon the magnitude and duration of the current supplied by the control signal. The effective diameter of the resultant channel 3 is a measure of the extent to which the device has been turned "on," or its "on-ness." If the phase change material 5 is then allowed to gradually cool, e.g., by gradually decreasing the current therethrough, the channel 3 will remain in its low resistance state. The "on-ness" of the device may be increased by applying a succession of turn-on pulses thereto.

Figure 2:
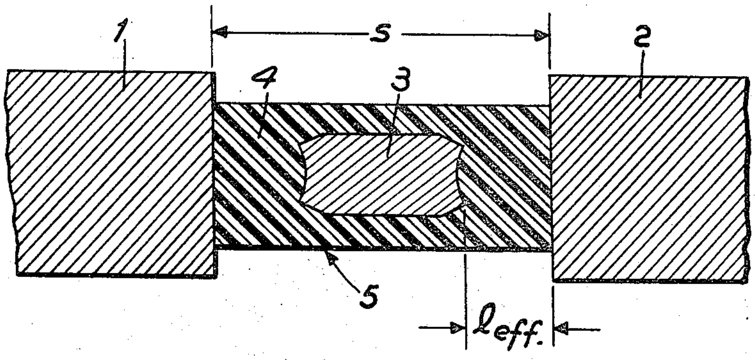

The phase change switching device shown in FIG. 1 may be turned "off" by application of a current therethrough of sufficient magnitude to melt or disarrange at least a portion of the channel 3 throughout its entire cross-section. If such a current $I_1$ is applied and suddenly removed, part of the channel 3 will then rapidly cool into its amorphous or polycrystalline high resistance state. The resultant "off" condition is shown in FIG. 2. It will be noted that a portion of the channel 3 remains in the "on" state but a portion of the channel has been converted to "off" material throughout its cross-section, thus reinstating the high resistance previously exhibited between electrodes 1 and 2. The amount of "on" material 3 which is converted to "off" material 4 will depend upon the magnitude and duration of the turn-off current $I_1$ as well as upon the waveform of said current which will determine the rate of cooling of the phase change material.

By referring to FIG. 2 it may be seen intuitively that the next time the device is turned "on" a smaller turn-on voltage will cause breakdown of the phase change material 5 between electrodes 1 and 2. Similarly, the harder the device is turned "off" (i.e. the smaller the amount of "on" material 3 remaining), the larger must be the next turn-on voltage to cause breakdown. Thus the non-saturable devices heretofore known require switching voltages and/or currents which will depend upon the past histories of operation of such devices. The net result is unstable or at best conditionally stable operation, as may be seen by reference to FIG. 3.

Figure 3:
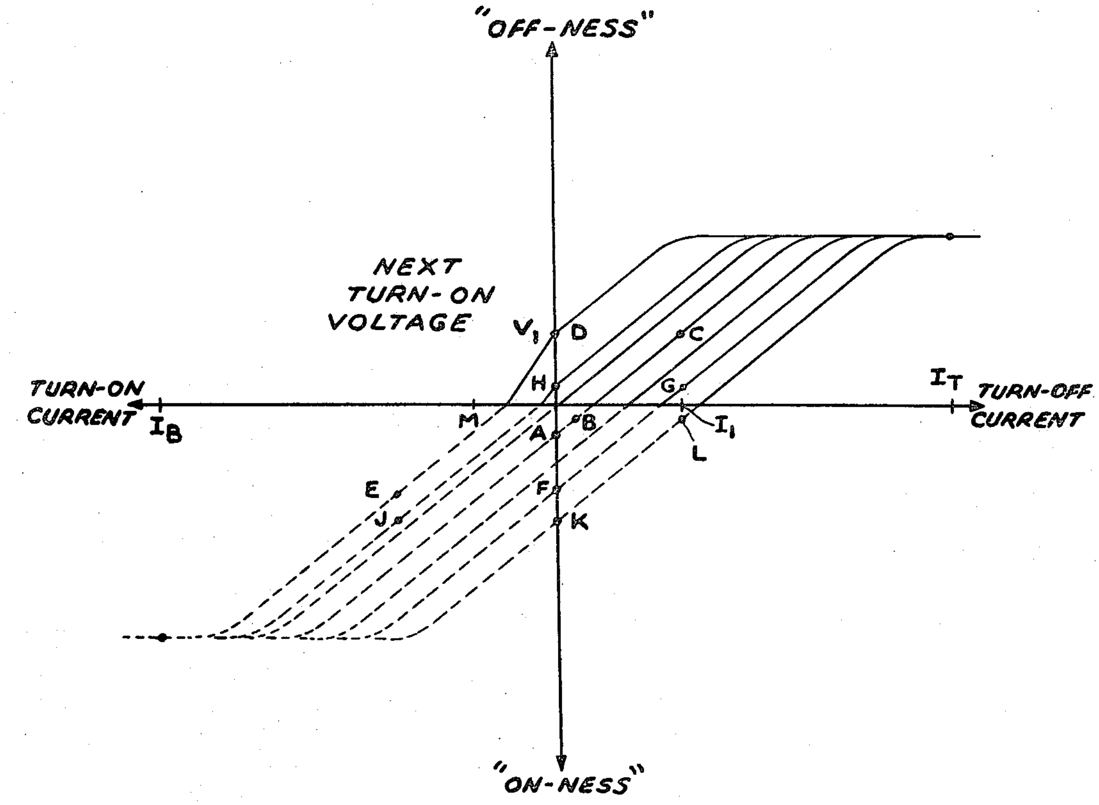

FIG. 3 shows typical switching characteristics for typical non-saturable phase change switches heretofore known. The solid lines show values which are directly measurable whereas the dash lines show values which can be determined only by calculation. As previously stated, the voltage required to turn on the device of FIG. 2 depends upon the "off-ness" of such device, i.e., the amount of residual "on" material 3 in said device between electrodes 1 and 2. A direct measure of this "off-ness" is the voltage required to break down the portion of the "off" material 4 between electrodes 1 and 2 and "on" region 3. Similarly, referring to FIG. 1, the "on-ness" of the switching device is related to the effective diameter of the conductive channel 3 which in turn is a measure of the amount of material which must be converted to the "off" state in order to turn off the device. There is no simple technique available for direct measurement of this "on-ness," but it may be calculated from measurments of device resistance under various terminal conditions.

FIG. 3 plots the "on-ness" and "off-ness" of the device shown in FIGS. 1 and 2 as functions of the turn-off current $I_1$ and the turn-on current, i.e., the current applied to the off device after its breakdown voltage $V_1$ has been exceeded. Assuming the device of FIG. 1 to have an initial "on-ness" denoted by A in FIG. 3, the application of a current pulse of magnitude $I_1$ will cause the phase change material 5 to assume the "off" state shown in FIG. 2 with an "off-ness" represented by point C. Upon sudden removal of the current pulse $I_1$, the material will permanently assume the "off-ness" denoted by point D corresponding to a required turn-on voltage $V_1$. Subsequent application of a turn-on voltage in excess of $V_1$ in conjunction with a turn-on current corresponding to E will cause the device to assume an "on-ness," which will remain after the voltage pulse has been gradually removed, denoted by F in FIG. 3. The next turn-off current pulse $I_1$ will cause the device to assume an "off-ness" represented by point G corresponding to a required turn-on voltage denoted by H. The next turn-on voltage pulse having an associated turn-on current corresponding to E will cause the device to switch to point J and to assume an "on-ness" denoted by K after the voltage pulse has been gradually removed. Subsequent application of a turn-off current of magnitude $I_1$ will be insufficient to turn the device "off," since the operating point will be moved only to point L which is still in the "on" region of the diagram. This condition is known as lock-on and is an inherent difficulty encountered in conjunction with operation of the nonsaturable phase change switches heretofore known.

It can be seen by reference to FIG. 3 that if a turn-off current $I_1$ is employed in conjunction with a turn-on current M the operating curve of the device will continuously traverse the same closed path thereby resulting in quasi-stable operation. However, this is an extremely critical condition since any deviation from the required values will ultimately result in a lock-on or lock-off condition wherein the device can no longer be switched from one state to another. It is this "vicious circle" behavior which has prevented those skilled in the art from achieving stable operation of phase change switches heretofore known. A similar difficulty appears in conjunction with the operation of unistable phase change switching devices which results in a variation of the required turn-on or turn-off voltage or current from cycle to cycle of operation.

It can be seen from FIG. 3 that if a sufficiently large turn-off current $I_T$ is employed, the same curve will be traversed each time during turn-on. This condition is known as saturated turn-off operation and is generally not readily obtainable with switching devices of the phase change type heretofore known. The reason for this difficulty is apparently the fact that the turn-off current $I_T$ required to achieve adequate saturation with satisfactory switching speeds is generally so large as to produce deterioration of device performance and to require excessive power supplies and heavy-duty circuitry.

Similarly, stable operation may be achieved by employing a suitably large turn-on current $I_B$ as shown in FIG. 3; during turn-off the material will then traverse the same operating curve during each cycle. While saturation in one direction only is sufficient to insure stable operation, it is desirable that saturation in both directions be attained in order that both the turn-on and turn-off voltages and/or currents may have acceptable tolerances. These objectives have not been attained in the phase change switching devices heretofore known.

It is also evident that if the entire mass of phase change material 5 could be switched between the "on" and "off" states as a unitary structure, the problem of differential expansion between the "on" and "off" materials would be eliminated, thus doing away with the microcracking effects which deteriorate prior art devices.

Referring once more to FIG. 1, which is not to scale, the effective diameter $d_{eff}$ of the "on" channel 3 is generally considerably less than the overall diameter of the phase change mass 5. Typically the diameter of the phase change mass 5 may be on the order of .040 inch whereas the effective diameter $d_{eff}$ of the "on" channel 3 is of the order of magnitude of .001 inch. The space between electrodes 1 and 2 may be on the order of .080 inch. In typical operation of non-saturable phase change switches heretofore known, it is not unusual to observe a number of parallel channels 3 simultaneously formed within the phase change material 5; the effect of these parallel channels is to further complicate device behavior and to render stable operation even more difficult.

According to the invention, a saturable phase change switching device is provided wherein the phase change material is in the form of a thin filament whose diameter may be on the order of .001 to .010 inch. The device is operated in such a manner that substantially all the phase change material therein is simultaneously switched to either the "on" or "off" condition, or both. Since only one conductive channel is permissible, and since there can be no differential expansion during said switching operation, stable operation is thereby assured.

Figure 4:
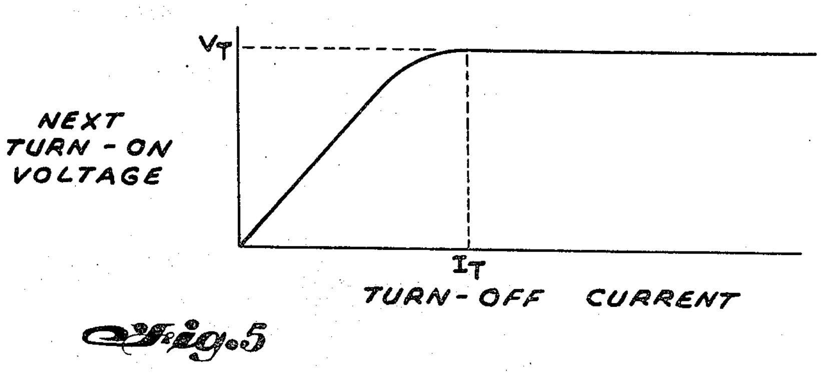
FIGS. 3 and 4 show switching curves to facilitate explanation of the behavior of prior art phase change switches and of switches according to the invention.

Referring to FIG. 4 which shows an operating curve of a saturable phase change switching device according to the invention, $I_T$ and $V_T$ represent the minimum turn-off current and turn-on voltage respectively which will assure stable operation. Values of $I_T$ above these minima will not deleteriously affect device performance unless, of course, the heat generated within the phase change material is so great as to cause permanent damage thereto. When turn-off currents in excess of $I_T$ and turn-on voltages in excess of $V_T$ are utilized, the device will always operate on the same switching curve.

Figure 5:
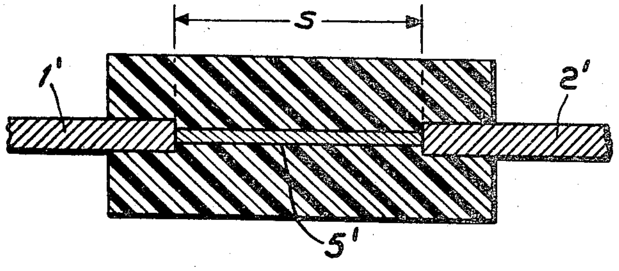
FIGS. 5 and 6 show two preferred embodiments of saturable phase change switches according to the invention.
Figure 6:
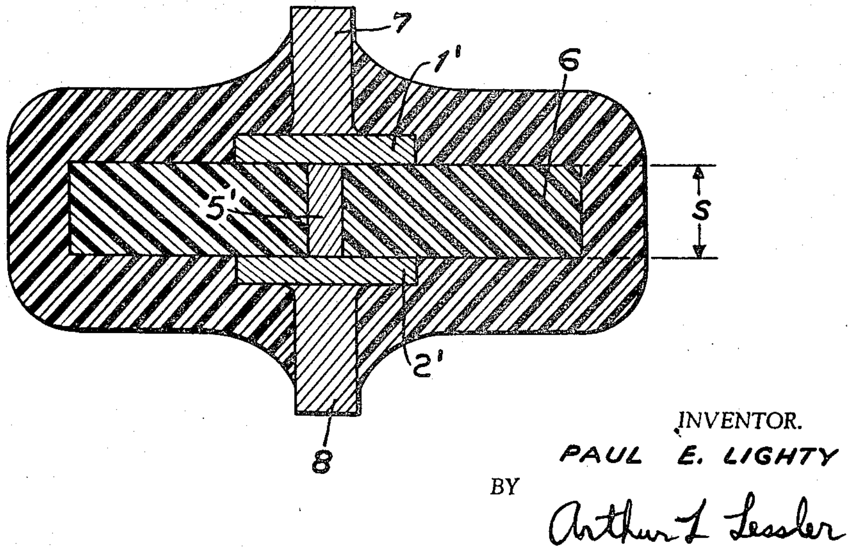

FIGS. 5 and 6 show preferred embodiments of saturable phase change switches according to the invention. In FIG. 5 a thin filament 5' of suitable phase change material is drawn between conductive electrodes 1' and 2' and the resultant structure is encapsulated to provide mechanical rigidity and environmental protection. The diameter of the filament 5' may be on the order of .001 inch. The separation *s* between electrodes 1' and 2' will be determined by the composition of the phase change material and by the desired threshold voltage $V_T$; typically, a separation of .080 inch will result in a turn-on threshold voltage on the order of 100 volts when phase change materials of the type described in Canadian Patent No. 699,155 are employed.

An alternative embodiment is shown in FIG. 6 wherein the phase change material 5' is disposed in a small hole through insulating disk 6. Electrodes 1' and 2' are provided to the phase change filament 5' in the form of thin metallic layers deposited upon opposite surfaces of insulating disk 6. Once again the filament diameter, which is substantially equal to the diameter of the hole through insulating disk 6, may be on the order of .001 inch and the thickness of insulating disk 6 may be on the order of .080 inch for a turn-on threshold voltage $V_T$ of approximately 100 volts. Suitable leads 7 and 8 are then provided to electrodes 1 and 2 respectively and the entire device is encapsulated for mechanical and environmental protection.

While the principles of the invention have been described above in connection with specific embodiments, and particular modifications thereof, it is to be clearly understood that this description is made only by way of example and not as a limitation on the scope of the invention.

What is claimed is:

1. An electrical component comprising:

a glass body capable of operating in two physical states, said states being a discrete high resistance state and a discrete low resistance state, having a resistivity within the range $10^2$ to $10^8$ ohm-cm., said body having the shape of a filament so narrow that only one conductive channel is formed therein, said filament having a diameter within the range of $10^{-3}$ to $10^{-2}$ inches and a length of 10 to 100 times the magnitude of said diameter;

a pair of electrodes each contacting one end of said filament; and means for applying a control signal to said electrodes to cause substantially all of the material in said filament to change from one physical state to the other physical state.

2. An electrical component according to claim 1, wherein said material remains in said selected state only while said control signal is present at said electrodes.

3. An electrical component according to claim 1, wherein said material remains in said selected state after said control signal is removed from said electrodes.

4. An electrical component according to claim 1, wherein said material is capable of assuming the state opposite to said selected state in response to an additional electrical control signal, further comprising means for applying said additional control signal to said electrodes to cause at least a portion of the material in said filament to assume said opposite state.

5. An electrical component according to claim 4, wherein said additional signal causes substantially all the material in said filament to assume said opposite state.

6. An electrical component according to claim 1, wherein said selected state is said low resistance state, and said control signal is a voltage in excess of a given threshold value.

7. An electrical component according to claim 1, wherein said selected state is said high resistance state, and said control signal is a current in excess of a given threshold value.

8. An electrical component according to claim 5, wherein said given control signal and said additional control signal do not vary during successive cycles of operation of said element.

9. An electrical component according to claim 4, further comprising:

an insulating disk having a hole therethrough, said filament being disposed within said hole, said electrodes being in the form of conductive layers on opposite surfaces of said disk.

References Cited

UNITED STATES PATENTS

| | | | |
|---|---|---|---|
| 2,751,477 | 6/1956 | Fitzgerald | 338—20 |
| 3,124,772 | 3/1964 | Newkirk | 338—22 |
| 3,312,922 | 4/1967 | Eubank et al. | 338—20 |
| 3,312,923 | 4/1967 | Eubank et al. | 338—20 |
| 3,312,924 | 4/1967 | Eubank et al. | 338—20 |
| 3,324,531 | 6/1967 | Hiatt | 338—20 |
| 3,327,272 | 6/1967 | Stern | 338—20 |
| 3,359,521 | 12/1967 | Lew et al. | 338—20 |

REUBEN EPSTEIN, *Primary Examiner.*

U.S. Cl. X.R.

338—22; 317—234, 237